Feb. 10, 1970     H. Z. LANGLAND     3,494,652
HYDRAULIC CYLINDER
Filed Aug. 16, 1968
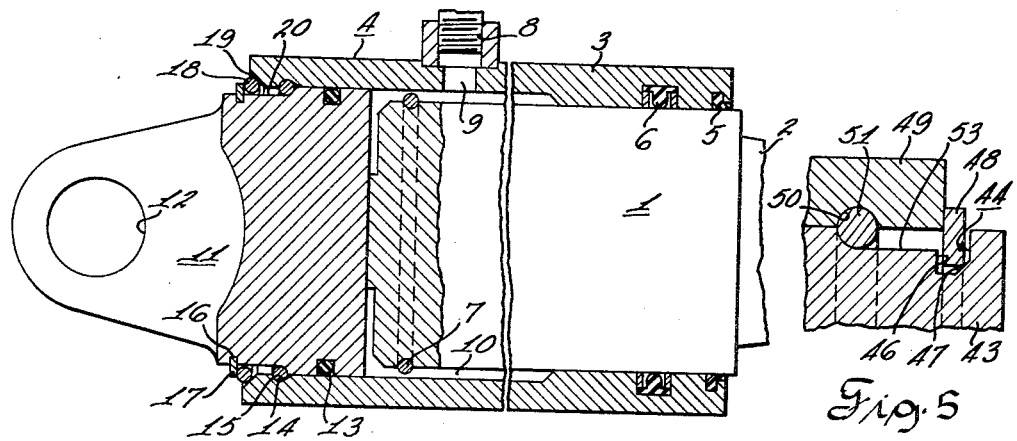
Fig. 1
Fig. 5
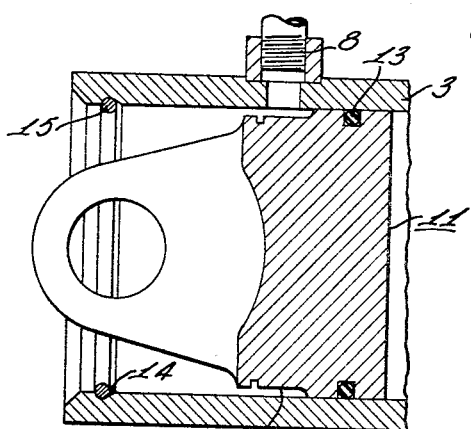
Fig. 2
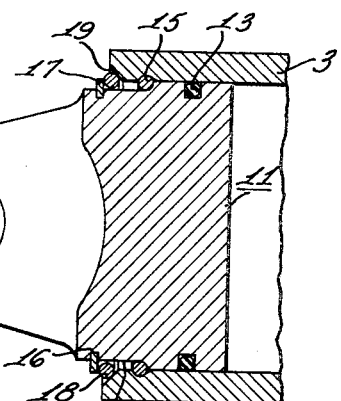
Fig. 3
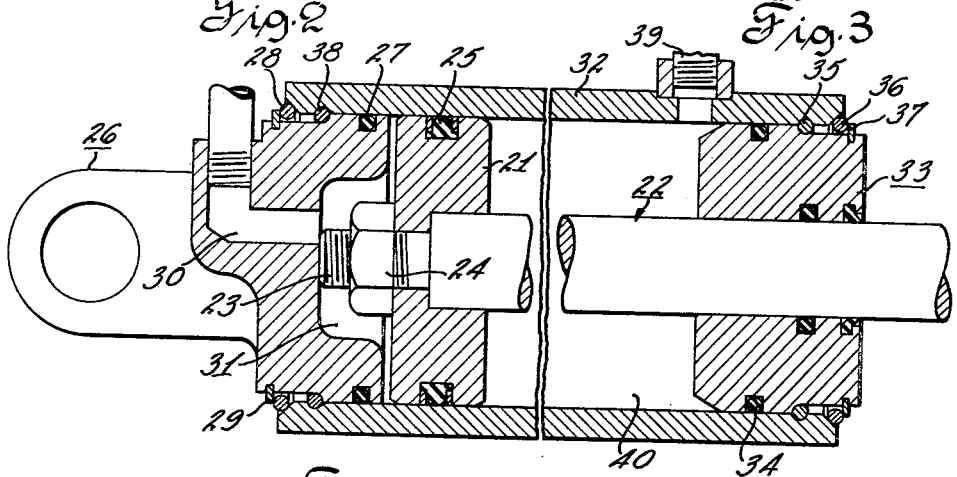
Fig. 4
Inventor
Herbert Z. Langland
By Richard H. Nelson
Attorney

United States Patent Office 3,494,652
Patented Feb. 10, 1970

3,494,652
HYDRAULIC CYLINDER
Herbert Z. Langland, Waukesha, Wis., assignor to Allis-Chalmers Manufacturing Company, Milwaukee, Wis.
Filed Aug. 16, 1968, Ser. No. 753,272
Int. Cl. B65d 45/00; F01b 29/08
U.S. Cl. 292—256.63                    10 Claims

ABSTRACT OF THE DISCLOSURE

A hydraulic cylinder having self-locking means once the cylinder is assembled and a method of assembling the same.

---

This invention relates to a hydraulic cylinder and more particularly to a hydraulic cylinder having self-locking means when the cylinder is assembled and also a method for assembling the hydraulic cylinder.

Hydraulic cylinders are used extensively on tractors and implements and vehicles of various kinds to improve their overall operation. Considering the extensive use of hydraulic cylinders there is a real need for reducing the unit cost of manufacturing and simplifying the assembling of hydraulic cylinders. Accordingly, this invention provides an improvement in a hydraulic cylinder and also provides a simplified method of assembling such a hydraulic cylinder.

It is an object of this invention to improve the manufacturing methods and the construction of a hydraulic cylinder.

It is another object of this invention to provide a method of assembling a hydraulic cylinder.

It is a further object of this invention to provide a hydraulic cylinder which is readily assembled and disassembled.

It is a further object of this invention to construct a head or a base for a hydraulic cylinder having a seal and locking means whereby the base or head is automatically locked in the hydraulic cylinder when assembled.

It is a further object of this invention to provide a head for a hydraulic cylinder having an annular groove for reception of a snap ring which in turn locks in an annular recess of the sleeve to prevent relative movement in a first direction while a second snap ring in an annular recess of the head prevents movement of the head relative to the cylinder in the opposite direction.

The objects of this invention are accomplished by providing a head for reception within a sleeve. The sleeve has an internal annular groove for reception of a snap ring. The head is formed with annular recess for receiving a snap ring which simultaneously locks in the annular groove of the sleeve. An annular groove is also formed in the external periphery of the head axially spaced form the annular recess for reception of the snap ring which abuts against the end of the sleeve to prevent movement in the second direction and thereby providing a self-locking assembly between the sleeve and the head of a hydraulic cylinder.

The assembly of the sleeve and head is a simple process whereby the head can be inserted into the sleeve and the snap ring will automatically lock the head from coming out of the sleeve once the assembly is made. A second snap ring is positioned in a groove in the head axially external of the sleeve which prevents axial movement of the head and the sleeve in the opposite direction. The assembly is simple and it automatically locks the head and the sleeve but it can be disassembled when desired.

The preferred embodiments of this invention will be described in the subsequent paragraphs and are illustrated in the attached drawings.

FIG. 1 illustrates a single acting cylinder with the seal and lock formed between the sleeve and the head of the cylinder.

FIG. 2 illustrates the first step in the assembly of the head and sleeve.

FIG. 3 illustrates the second step in the assembly of a hydraulic cylinder.

FIG. 4 illustrates a double acting hydraulic cylinder with the seal and lock structure on both ends of the cylinder.

FIG. 5 illustrates a modification which is simplified from that shown in FIG. 1 for assembling and locking of a hydraulic cylinder.

Referring to the drawings, the first embodiment of this invention is shown in FIG. 1. The piston 1 having a rod end 2 is received within the sleeve 3 of the cylinder 4. The sleeve 3 is formed with a wiper seal 5 and the fluid seal 6 which engage the periphery of the piston 1. Piston 1 also has a snap ring 7 received in a groove on the periphery of a piston which limits the movement in the right-hand direction of the piston 1.

A fitting 8 is connected to suitable conduit means for receiving fluid which flows through the passage 9 into the cylinder 4 to the pressurizing chamber 10 within the cylinder.

The base end of the cylinder 4 is formed with the base 11 having a pin opening 12 for connection with a suitable mechanism. The base 11 extends into the sleeve 3 and is provided with a fluid seal 13. The sleeve 3 defines an annular recess 14 for receiving a snap ring 15 in its locked position.

The external periphery of the base 11 is also formed with a groove 16 for receiving the snap ring 17. The retainer ring 18 is positioned intermediate the snap ring and the beveled surface 19 on the sleeve 3. The assembly as shown is locked in position for operation of the cylinder 4.

FIG. 2 illustrates the first step in the assembly of the hydraulic cylinder and FIG. 3 shows a second step in which the assembly is locked together. The base 11 with the seal 13 is inserted within the sleeve 3 and pushed beyond its assembled position. The snap ring 15 is then positioned within the annular recess 14 where it remains locked in position. The head 11 is then pulled in the left-hand direction to the position as shown, in FIG. 3, wherein the ring 15 in annular recess 14 and the annular recess 20 limit any further movement of the base 11 relative to sleeve 3.

When the base end 11 is pulled in the left-hand position as shown in FIG. 3, the retainer ring 18 is then positioned adjacent the beveled end surface 19 of the sleeve 3. The snap ring 17 is then positioned in the annular groove 16 and the assembly is locked.

Referring to FIG. 4 a double acting cylinder is shown wherein a piston 21 is connected to a piston rod 22 by means of threaded rod end 23 and nut 24. A seal 25 is positioned in an annular groove around the periphery of the piston 21.

The base 26 is positioned in the base end of the cylinder with a seal 27 received in the periphery of the base 26. The snap ring 38 locks the assembly to limit movement in the left-hand direction, while the retainer ring 28 and snap ring 29 limit the movement of the base in the right-hand direction.

Inlet passage means 30 provide passage means for the pressurized fluid into the chamber 31, to drive the piston 21 in the right-hand direction.

The sleeve 32 has a similar means for assembling the head 33. A seal 34 is formed in the peripherial groove of the head 33. A snap ring 35 locks the sleeve 32 and the head 33 from relative movement in the first direction. The retainer 36 and the snap ring 37 limit the movement in the opposite direction. The assembling process and construction is the same as shown in FIG. 1.

A suitable conduit means 39 is provided for admitting or discharging pressurized fluid to the chamber 40. FIG. 4 illustrates the manner in which the base end and the head end of the cylinder can be assembled with the sleeve 32.

FIG. 5 illustrates a modification wherein the head 43 is formed with annular recess 44. The annular groove 44 defines a radial facing 46 on the left-hand side of the groove while the right-hand side of the groove includes a beveled surface 47 which engages the inner periphery of the snap ring 48. The beveled surface biases the snap ring 48 to a firm engaging position with the sleeve 49. The sleeve 49 is formed with an annular recess 50 for receiving a snap ring 51. The snap ring 51 is also received within an annular recess 53 in the external periphery of the head 43. The assembly of the hydraulic cylinder shown in FIG. 5 is essentially the same as that shown in FIG. 1. The assembly is simplified and the snap ring 48 within the groove 44 provides the same function as the retainer ring 18 and snap ring 17 do in FIG. 1.

The preferred embodiments of this invention have been illustrated and described wherein the hydraulic cylinder utilizes a simple means of assembly. The head is inserted within the sleeve to a point beyond its permanent position to permit the insertion of a snap ring. As the head is withdrawn its return movement is limited by the snap ring. A second snap ring is inserted in the head which blocks the reverse movement of the head. This provides a permanent assembly of the head and sleeve so that the head is locked in its position relative to the sleeve. The head contains a fluid seal in the assembly to prevent fluid from flowing from the pressurized chamber. The assembly can be dismantled by removing the external snap ring which will allow moving the head internally within the cylinder to remove the second snap ring and then complete dismantling of the head from the sleeve.

The preferred embodiment of this invention has been illustrated and described and the scope of this invention will be defined by the attached claims.

The embodiments of this invention in which an exclusive property or privilege is claimed are defined as follows:

1. A hydraulic cylinder including, a sleeve defining an internal annular recess adjacent the end of said sleeve, a head received within said sleeve and defining an external annular recess and groove on the end portion of said head, a locking element received within said annular recess of said sleeve and said annular recess of said head for preventing relative movement between said sleeve and said head in a first direction, a second locking element for reception within said annular groove of said head for preventing relative movement between said head and said sleeve in a second direction and thereby provide a locked assembly of said hydraulic cylinder.

2. A hydraulic cylinder as set forth in claim 1 wherein said annular recess in said head is essentially a reduced diameter facing on the end of said head.

3. A hydraulic cylinder as set forth in claim 1 wherein said locking element received within the annular recess of said sleeve is a snap ring for preventing relative movement between the sleeve and head.

4. A hydraulic cylinder as set forth in claim 1 wherein said locking elements for reception in said recesses and grooves are snap rings to prevent relative movement in both directions between said sleeve and said head.

5. A hydraulic cylinder as set forth in claim 4 wherein a retainer ring is positioned between the snap ring in the annular groove in said head and the end of said sleeve to prevent relative movement in the second of said directions.

6. A hydraulic cylinder as set forth in claim 1 wherein the annular groove in said head defines a beveled surface causing said second snap ring to snugly seat against the end of said sleeve in response to the contracted force of said second snap ring to thereby lock said assembly.

7. A hydraulic cylinder as set forth in claim 1 wherein the annular groove formed in said head defines a radial surface and an axial surface adjoined by a beveled surface, said second locking element is a contractible element received within said annular groove contracting against said beveled surface causing said element to move axially and firmly seal against the end of said sleeve to thereby lock the assembly.

8. A hydraulic cylinder as set forth in claim 1 wherein said sleeve has a flared end surface engaging a retainer ring held by a snap ring received within the annular groove of said head.

9. The method of assembling a hydraulic cylinder comprising the steps, placing the head of a hydraulic cylinder defining an annular recess and an annular groove externally on the end portion of said head within a sleeve defining the annular recess on its inner periphery and positioning the head within said sleeve beyond its permanent assembled position, inserting a snap ring in the annular recess of said sleeve, returning the head to seat on said snap ring in the recess on the inner periphery of said sleeve and the recess on the outer periphery of said head for locking further return movement of said sleeve relative to said head, inserting a snap ring in the groove on said head thereby locking the assembly.

10. The method of assembling the hydraulic cylinder as set forth in claim 9 wherein a retainer ring is positioned between the sleeve and the second snap ring prior assembling of said second snap ring.

References Cited

UNITED STATES PATENTS

| | | | |
|---|---|---|---|
| 3,070,127 | 12/1962 | Gratzmuller | 220—55 |
| 3,136,230 | 6/1964 | Buckley | 92—128 |

JOSEPH R. LECLAIR, Primary Examiner

G. T. HALL, Assistant Examiner

U.S. Cl. X.R.

92—128